United States Patent [19]

Potočnjak

[11] Patent Number: 4,676,539

[45] Date of Patent: Jun. 30, 1987

[54] APPARATUS FOR SUPPORTING AND TRANSPORTING HEAVY LOADS

[76] Inventor: Tomislav Potočnjak, Neckarstrasse 64/1, 7128 Lauffen, Fed. Rep. of Germany

[21] Appl. No.: 834,737

[22] Filed: Feb. 28, 1986

[30] Foreign Application Priority Data

Feb. 28, 1985 [DE] Fed. Rep. of Germany ....... 3507050

[51] Int. Cl.$^4$ ................................................ B66C 1/18
[52] U.S. Cl. .................................. 294/67.4; 294/67.1; 211/60.1
[58] Field of Search .................... 294/67.4, 67.2, 67.41, 294/67.3, 67.1; 206/443, 509; 414/277; 211/60.1, 194

[56] References Cited

U.S. PATENT DOCUMENTS

| | | | |
|---|---|---|---|
| 3,028,186 | 4/1962 | Skabic | 294/67.1 |
| 3,537,599 | 11/1970 | Jay | 211/60.1 |
| 3,559,812 | 2/1971 | Wolf | 211/60.1 |

Primary Examiner—James B. Marbert
Attorney, Agent, or Firm—Becker & Becker, Inc.

[57] ABSTRACT

An apparatus for supporting and transporting of heavy loads, especially metallic profiled-bars and the like which have at least a U-shaped bearing block. The bearing block has a foundation and two side parts, each having a suspension, attachment or mounting bracket provided thereon. Supporting arms provided on a traverse engage the attachment, suspension or bracket. For that, the attachment, suspension or bracket of the bearing block can have a structure as closed support rings, hooks or eyelets with two legs or arms inclined in a roof-shaped configuration. One of these legs or arms additionally in a plane transverse to the longitudinal direction of the foundation has such an offset relative to the other leg or arm, that a suspension free space is formed for a positively-guided engagement of the supporting arm.

18 Claims, 11 Drawing Figures

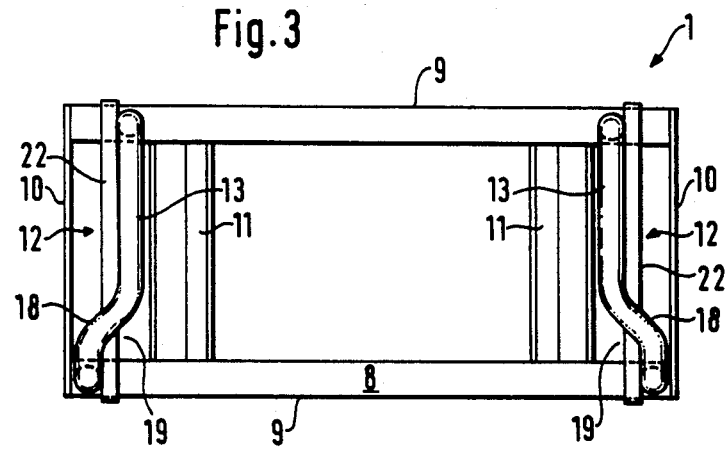
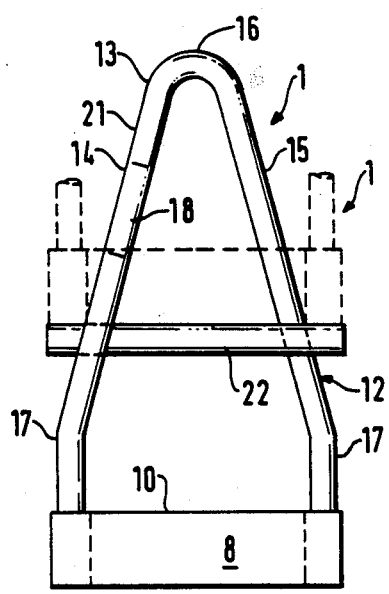
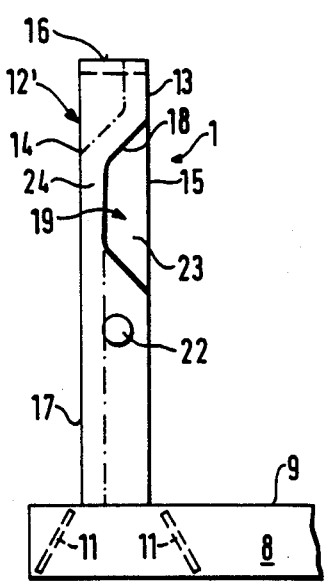

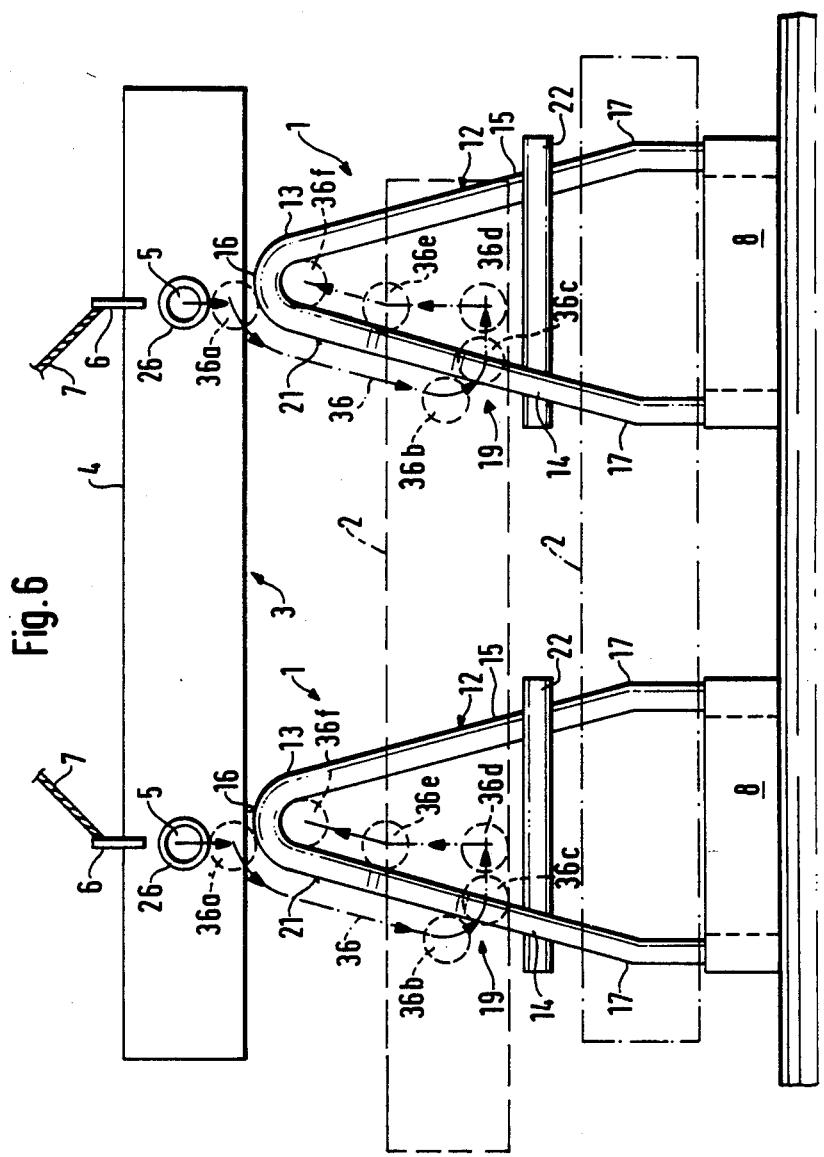

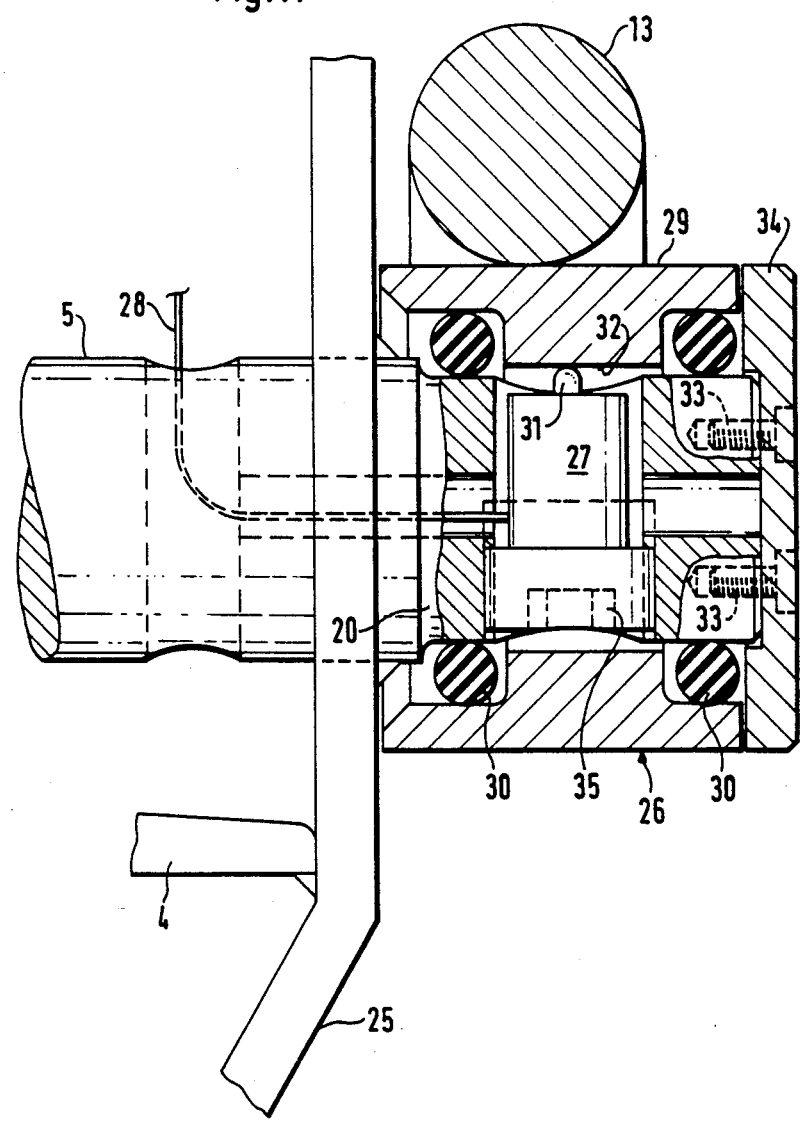

APPARATUS FOR SUPPORTING AND TRANSPORTING HEAVY LOADS

BACKGROUND OF THE INVENTION

1. Field of the Invention

The present invention relates to an apparatus for supporting and transporting of heavy loads, especially metallic profiled-bars and the like which have at least a U-shaped bearing block. The bearing block has a foundation and two side parts, each having a suspension, attachment or mounting bracket means provided thereon. Supporting arms provided on a traverse engage in these attachment, suspension or bracket means. For that, the attachment, suspension or bracket means of the bearing block are constructed as closed support rings, hooks or eyelets with two legs or arms inclined roof-shaped. The one of these legs or arms additionally in a plane transverse to the longitudinal direction of the foundation has such an offset relative to the other leg or arm, that a suspension free space is formed for a positively-guided engagement of the supporting arm.

2. Description of the Prior Art

With a known device or apparatus of this type according to German Patent No. 27 38 332, it is disadvantageous that the supporting arms of the traverse strike against the top edge of the suspension hooks during hanging or suspending in the hook suspensions of the bearing blocks which are bent in a horn-like or horny manner. This is caused thereby that the supporting arms of the traverse impinge or strike upon the upper free-lying or exposed narrow edge of the plate-shape suspension hooks during the suspension procedure and notching or nick damages are caused on this narrow edge because of the great weight of the traverse. The notch or nick damages preclude a low-friction sliding of the traverse hanging or suspended on a lifting cable of a hoisting unit, so that thereby an undesired automatic shuting-off of the hoisting unit can occur. A further disadvantage exists therein that the traverse with the four arms shifts so far laterally during the introductory procedure during the movement downwardly so that a correspondingly adequate or sufficient space respectively safety spacing must be provided for this lateral deflection. The lateral deflection is necessary so that the supporting arms of the traverse can come past along the horny hook suspensions or bracket means, until they finally have reached a depth or low position in which they are located in the opening region of the hook. Thereafter, the traverse is pulled-up or raised via the hoisting unit so that the supporting arms come into the horny suspension hooks.

As a consequence of the inwardly bent construction of the suspension plates of the hooks there is necessary a sufficient lateral safety spacing on both sides of the traverse, whereby a loss as to usable space results during the employment of the known bearing blocks in halls or similarly limited spaces or chambers. Additionally the known embodiment has the disadvantage that the hook-shaped suspension plates are complex and costly to produce and consequently expensive, since the suspension plates are welded between additionally provided corner pillars of the supporting block.

An object of the present invention is to provide an apparatus for supporting and transporting of heavy loads in accordance with the foregoing features and further improved thereby that a simple and cost-advantageous production is attained with the fewest possible parts and that also during careless manner of operation of the crane operator that the mounting or introductory procedure of the supporting arms can be completed without damaging of the actual suspension parts in such a manner being carried out automatically as positively guided with great security and certainty in order that in the event of a non-hung or suspended supporting arm end also the remaining supporting arm ends cannot occupy the hung-in or suspension position.

This object is fulfilled by having the hanging-up or suspension of the bearing block constructed as a closed ring or supporting eyelet with two arms or legs inclined in a roof-shape and of which legs or arms, the one leg or arm in a plane transverse to the longitudinal direction of the foundation is offset or displaced laterally for formation of a suspension free space for the supporting arm with respect to the other arm or leg.

These and other objects and advantages of the present invention will appear more clearly from the following specification in connection with the accompanying drawings.

DETAILED DESCRIPTION OF THE DRAWINGS

FIG. 3 is a plan view of the bearing block shown in FIGS. 1 and 2;

FIG. 4 is a side view of the bearing block of FIGS. 1 through 3 with a dashed-line indication of a further stacked bearing block;

FIG. 5 is a front view of a part of the bearing block according to the present invention in an illustration similar to that of FIG. 2, although in a further exemplified embodiment;

FIG. 6 is a side view of the inventive apparatus with two bearing blocks carrying the load with the traverse located thereon in different introductory positions;

Figure 8:
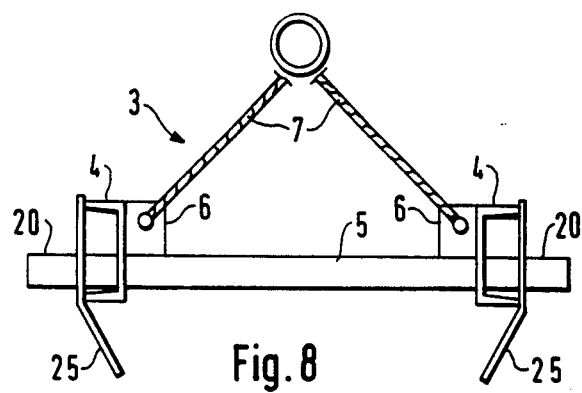
FIG. 8 is a front view of the traverse of FIGS. 6 and 7 with U-shaped rolled-steel-section longitudinal supports or carriers.
Figure 9:
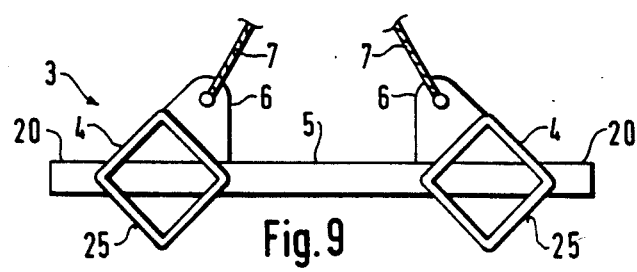
FIG. 9 is a front view of the traverse similar to that of FIG. 8 although with longitudinal supports or carriers formed of square tubes or pipes.
Figure 10:
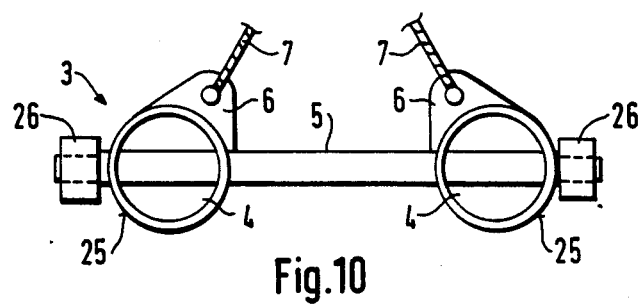
Figure 7:
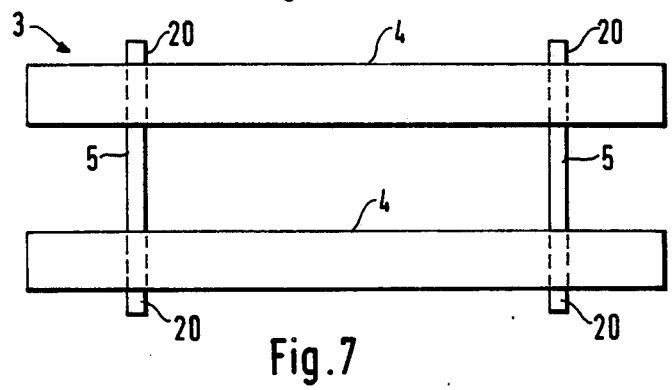
FIG. 7 is a plan view of the traverse of FIG. 6.

FIG. 10 is a front view of the traverse similar to that of FIGS. 8 and 9 although with longitudinal carriers or supports formed of pipes or tubes circular in cross section and having bearing pulleys, carrier rollers or bogie wheels provided at the ends of the supporting arms; and FIG. 11 is an enlarged, partially sectioned view of the supporting-arm end region with a microswitch arranged inside the bearing pulley or carrier roller for a busy-signal communication or message.

DETAILED DESCRIPTION OF PREFERRED EMBODIMENTS

Referring now to the drawings in detail, the inventive apparatus illustrated in the drawings is provided especially for supporting and transporting of heavy loads including metal rods or bars such as tubes, iron rod, round steel or iron bars, T-supports or carriers, angle irons and similar profile-sectional rods or bars and according to the exemplified embodiment or form of construction of FIG. 6 having two bearing blocks 1. The two bearing blocks 1 are arranged spaced from each other for receiving the longitudinally extending load 2. To the extent that the shorter load (approximately only half as long) is to be supported and transported, it is basically also possible to provide only a single bearing block 1 for this purpose.

Above the two bearing blocks 1 there is located a traverse 3 having longitudinal supports or carriers 4 and supporting arms 5, on which the bearing blocks can be hung or suspended. The traverse 3 has fastening brackets 6, which are welded to the longitudinal carriers or supports 4 and preferably also are welded to the supporting arms 5 and on which chains or cables 7 of a lifting mechanism not illustrated in greater detail (crane runway or the like) are arranged.

The bearing block 1 illustrated in the FIGS. 1–4 and 6 has a foundation 8 carrying or supporting the load 2, which foundation has two parallel longitudinal profiled sections 9 as well as two face plates 10 and embodied or constructed therewith preferably as a rectangular-shaped profile or section frame. Inside this profile or section frame between the two longitudinal profiles or section 9 there are provided additional bracing, stiffening or reinforcement struts or supports which are arranged inclined respectively having inclined guide surfaces and being constructed as an introduction incline 11.

On the two end or face-side regions of the foundation 8, vertical side parts 12 are provided which are located over the introduction inclines 11 and bracing upwardly at right angles from the foundation or base body 8. The side parts 12 preferably can be produced out of a single metal tube respectively, which metal tube is so bent that the upper side-part region is constructed as a closed carrier or supporting eyelet or ring 13 having two roof-shaped inclined arms or legs 14, 15. The ridge or coping connecting the two arms or legs 14, 15 of the carrier or supporting eyelet or ring 13 is thereby connstructed preferably as a substantially semi-circular-shaped round bend or arch 16. Downwardly directed extensions 17 are connected to the two arms or legs 14, 15 of the carrier or supporting eyelet or ring 13 and the ends of the extensions 17 are welded onto the top side of the foundation or base body 8.

Figure 1:
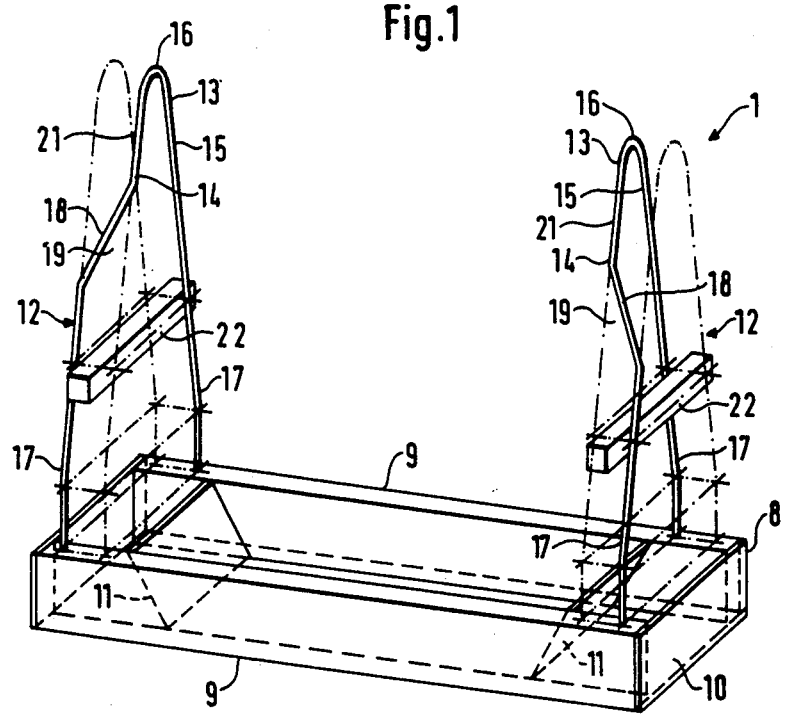
FIG. 1 is a perspective view of a bearing block of the present inventive apparatus in a preferred embodiment shown as a schematic illustration.
Figure 2:
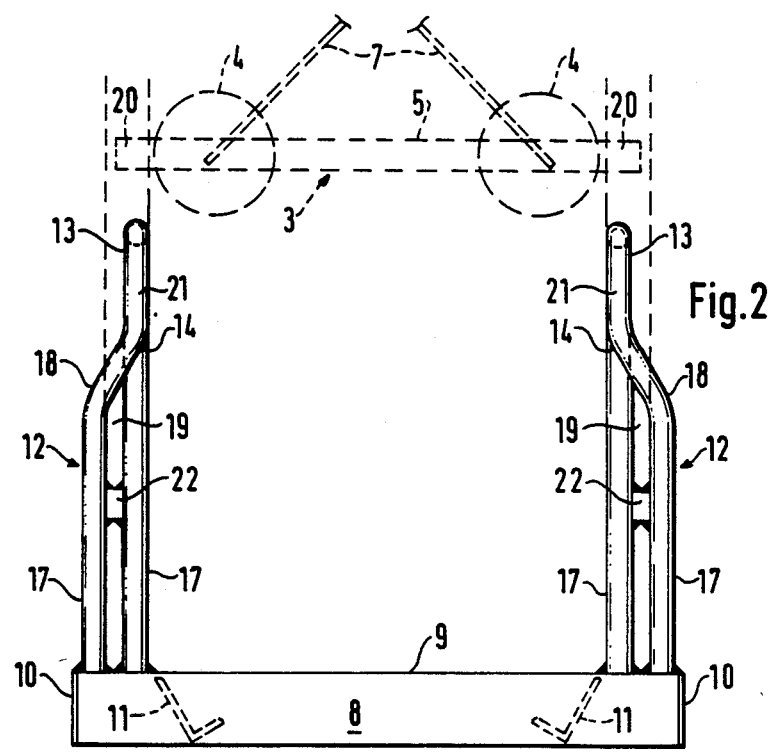
FIG. 2 is a front view of the bearing block of FIG. 1 having besides a dashed-line indication of the traverse of the inventive apparatus.

Especially in FIGS. 1 through 3 inclusive there is recognizable that the one arm or leg 14 of the carrier or supporting eyelet or ring 13 has an offset 18 as seen or located in the plane transverse to the longitudinal direction of the foundation or base body 8 and this offset 18 is so constructed that a hanging-in or suspension free space or chamber 19 is formed structurally for introduction of the end part 20 of the carrier or supporting arm 5. The offset piece 18 for the hanging-in or suspension free space or chamber 19 is located preferably below a guide part 21 of the arm or leg 14 extending inclined downwardly below one of the round bends or arches 16, so that the end part 20 of the carrier or supporting arm 5 also is guided positively in the region of the hanging-in or suspension free space or chamber 19 during a careless lowering of the traverse 3 and during subsequent lifting or raising of the traverse 3 coming into the region of the round bend or arch 16 of the carrier or supporting eyelet or ring 13.

Most of all FIGS. 2 and 3 show clearly that the spacing between the two carrier or supporting eyelets or rings 13 of the bearing block 1 is different in the longitudinal direction of the foundation or base body 8 as seen in the region of the arms or legs 14, 15. And more over the spacing between the two arms or rings 14, which have the offset piece 18, is greater than the spacing between the two other arms or legs 15, which are not displaced or offset out of the plane. Furthermore there is to be recognized that between the two arms or legs 14, 15 of a carrier or supporting eyelet or ring 13 of each there is arranged a horizontal connection strut or support 22. The connection strut or support 22 is located approximately in the center between the base body or foundation 8 and the upper round bend or arch 16 of the carrier or supporting eyelet or ring 13. The length of the connection strut or support 22 with that corresponds approximately to the width of the base body or foundation 8. The connection strut or support 22 contributes to the stiffening or reinforcement of the side part 12 of the bearing block 1 and serves additionally as a bearing or support for the stacking of several bearing blocks 1 on each other (FIG. 4). The connection strut or support 22 can be made for example out of a flat steel or a square tube or pipe.

In accordance with the exemplified embodiment illustrated in FIG. 5, the side part 12' of the bearing block 1 is made of a flat steel which in essence has been bent likewise in an acute-angled roof-shaped like the side part 12 of the previously described exemplified embodiment, so that likewise a closed carrier or supporting eyelet or ring 13 with an upper round bend or arch 16 and two inclined dropping legs or arms 14, 15 as well as extensions 17 connected thereto is provided therewith. A difference exists however therein that the offset piece 18 of the arm or leg 14 is not formed by bending, but rather by cutting or machining out of a recess 23, which serves as a hanging-in or suspension free space or chamber 19 for the carrier or supporting arm 5, so that in the region of the offset piece 18 there exists a supporting or carrier web, crosspiece or bar 24 reduced in the width of the arm or leg 14. Within the context of the teaching of the present invention there also can be expedient and purposeful to produce the carrier or supporting eyelet or ring 13 respectively the side part 12 for example out of an oval pipe or tube, a square pipe or tube or a differently profiled or shaped rod or bar material.

Especially in FIGS. 7 through 10 there is recognizable and ascertainable that the traverse 3 receiving the bearing blocks 1 has two parallel longitudinal carriers or supports 4 on which the carrier or supporting arms 5 constructed as transverse struts or supports, which are oriented or aligned parallel to the base body or foundation 8 of the bearing block 1, are so secured or fastened that torsionally stiff rectangular frame, whereby the end parts 20 of the carrier or supporting arms 5 project only slightly or somewhat externally on the longitudinal carriers or supports 5. With the exemplified embodiment of FIG. 8, the longitudinal carriers or supports 4 consists of roller sections or profiles U-shaped in cross section. On the outer sides of the U-longitudinal carriers or supports 4 there are side plates arranged which are constructed or embodied downwardly as guide surfaces 25 extending at an incline to each other.

With the traverse 3 of FIG. 9, the longitudinal carriers or supports 4 consists of square pipes or tubes with which two oppositely located corners lie in the vertical plane and the two other oppositely located corners lie in the horizontal plane. The carrier or support arms 5 pass through the square longitudinal carriers or supports 5 diagonally through the corner regions lying in the horizontal plane. The traverse 3 illustrated in FIG. 10 has longitudinal carriers or supports 5 produced out of round pipes or tubes and these are crossed diametrically by the support or carrier arms 5. Both with the square longitudinal carriers or supports 4 of FIG. 9 and also with the tubular longitudinal supports or carriers 4 of FIG. 10, the longitudinal carrier or support undersides are constructed the same as the guide surfaces 25. With the exemplified embodiment of FIG. 10, a carrier or supporting roller 26 is mounted or journaled respectively on all end parts 20 of the carrier or supporting arms 5. The carrier rollers, bearing pulleys or bogie wheels 26 can have ball bearings or the like so that a decidedly low-frictional rolling-off is attained to bring the hanging-in inner suspension of the traverse 3 in the carrier or supporting eyelets or rings 13 of the bearing block 1. Attention is directed still further thereto that the FIGS. 8 through 10 inclusive clearly disclose that the fastening brackets 6 for a satisfactory load distribution or bearing pressure are welded both on the longitudinal carriers or supports 4 and also being welded on the carrier or support arms 5.

FIG. 11 shows that a microswitch 27 is mounted or installed in the carrier or supporting roller 26 of the carrier or supporting arm 5. The microswitch 27 is connected to an electrical line or conductor 28 and is provided for a busy-signal communication or message during the time that with a weight loading, accordingly during lifting or raising of the traverse 3, a light-and/or acoustically signal is produced which indicates that the carrier or supporting arms 5 of the traverse 3 are hung or suspended completely and correctly in all of the carrier eyelets or supporting rings 17 of the bearing blocks 1, so that the load 2 can be drawn up or raised without danger via the lifting mechanism. For the actuation of the microswitch 27 there is noted that the carrier or supporting roller 26 has an outer contact ring 29 which engages with the peripheral surface thereof against the inner side of the round bend or arch 16 of the carrier eyelet or supporting ring 13 and mounted or supported upon two resilient or rubber-elastic O-rings 30 arranged spaced from each other on the end part 20. In the spacing or clearence range between these two O-rings 30 there is located the microswitch 27, of which the actuation plunger or push rod 31 engages against the inner surface 32 of the contact ring and upon loading of the contact ring 29 is pressed into the microswitch 27. The outer face side or end of the carrier or supporting roller 26 is closed by a closure cover 34 releasably fastened via screws 33, so that a tight shielding or seal protection against dirt and contamination is provided thereby. Additionally there is to be recognized that an adjustment screw or setting means 35 is provided under the microswitch 27, via the path of the actuation plunger or push rod 31 being adjustable in a stepless manner for a reliable switching point or location.

FIG. 6 illustrates the curve or path of movement 36 of the end parts 20 respectively carrier or supporting rollers 26 of the carrier or supporting arms 5 during dropping or lowering thereof and subsequent lifting or raising and drawing-up of the traverse 3 during the hanging-in or suspensions procedure into the carrier eyelets or support rings 3. The carrier or supporting roller 26 of the carrier or supporting arm 5 in the position 36a engages the outer side of the round bend or arch 16. During the further lowering of the traverse 3, the carrier rollers 26 roll upon the inclined guide parts 21 downwardly into the region of the hang-in or suspension free space or chamber 19 until they occupy the position 36b which represents the greatest oscillation or swinging of the traverse 3. In the deepest position 36c, the carrier roller 26 comes through the hanging-in or suspension free space or chamber 19 into the carrier eyelet or support ring 13 and swings inwardly into the position 36d. Thereafter, the traverse 3 is pulled or drawn up and raised so that the carrier roller 26 comes into engagement against the inner side of the carrier eyelet or supporting ring 13 via the region of the hanging-in or suspension free space or chamber 19 into the position 36e. During further raising or pulling and drawing up of the traverse 3, the carrier roller 26 comes into the uppermost position 36f with low friction, whereby the carrier roller 36 is located at the inner side of the carrier eyelet or supporting ring 13 in the region of the substantially semi-circular-shaped round bend or arch 16 and whereby the actual engagement of the load occurs. As soon as the load 2 is taken up by the carrier roller 26 in the uppermost region of the carrier eyelet or supporting ring 13, a signal results via the microswitch 27 which indicates that the hanging-in or suspension procedure is concluded with certainty and as prescribed.

An essential advantage of the present inventive apparatus consists therein that during the entire low-friction hanging-in or suspension procedure that the traverse 3 during lowering or dropping-down thereof on the carrier eyelets or supporting rings 13 always is guided along an inner strut or cross beam. Consequently there is guaranteed and assured additionally a high safety, security and certainty during the hanging-in or suspension, since via the carrier rollers 26 arranged in pairs on the carrier or supporting arm 5, the hanging-in or suspension is blocked when a part is snagged or remains hanging on one side. Only when all four carrier rollers 26 find a free path into the carrier eyelets or supporting rings 13, can the hanging-in or suspension be carried out so that collectively with a simple and straightforward means there is provided a cost-advantageous and expedient production and high safety certainty and security against improper and incorrect handling, manipulation, control or operation.

The present invention is, of course, in no way restricted to the specific disclosure of the specification and drawings, but also encompasses any modifications within the scope of the appended claims.

What I claim is:

1. An apparatus for supporting and transporting heavy loads, especially metallic section rods, bars, pipes, tubes, and the like, with at least one U-shaped bearing block which has a foundation and two side parts on which respectively a suspension is provided in which a carrier arm of a traverse is suspendible, comprising:
    the improvement therewith that the suspension of the bearing block is constructed as a carrier eyelet with two roof-shaped inclined legs of which one leg is offset laterally relative to the other leg in a plane transverse to the longitudinal direction of the foundation in a location for formation of a suspension free space for the carrier arm; and an offset piece of the arm or the suspension free space arranged below a guide part of the arm dropping at an incline below a ridge of the carrier eyelet, said ridge of the eyelet being constructed as an acute-angle-shaped arch of the arm, said carrier eyelet being fastened with respect to extensions on the foundation adjoining the roof-shaped location of the legs and structurally embodied therewith as a side part of said bearing block.

2. An apparatus according to claim 1, wherein said carrier eyelet with the offset piece for the suspension free space and said extensions of the legs are made of metal tubing bent into an acute-angle roof-shaped configuration.

3. An apparatus according to claim 1, in which said carrier eyelet with said extensions of the legs is made of a flat steel bent into an acute-angle roof-shaped configuration and the suspension free space in the offset region of the inclined leg is constructed as the width of the flat steel as far as to a recess reducing crosspiece therewith.

4. An apparatus according to claim 1, in which a horizontal connection support strut is arranged between two legs of the carrier eyelet below the offset piece for the suspension free space to support a stacked further bearing block.

5. An apparatus according to claim 1, wherein said connection support strut is arranged approximately in the middle between said foundation and said ridge of the carrier eyelet between the two legs thereof and the length thereof corresponds approximately to the width of said foundation.

6. An apparatus according to claim 1, wherein spacing between said legs of two carrier eyelets arranged on both end faces of the bearing block is greater in the longitudinal direction of the foundation of the suspension free space than the spacing between the other legs of the two carrier eyelets.

7. An apparatus according to claim 1, wherein at least one introductory incline for carrier eyelet centering during stacking of several of said bearing blocks is provided below said carrier eyelet on said foundation.

8. An apparatus for supporting and transporting heavy loads, especially metallic section rods, bars, pipes, tubes, and the like, with at least one U-shaped bearing block which has a foundation and two side parts on which respectively a suspension is provided in which a carrier arm of a transverse is suspendible, comprising:
the improvement therewith that the suspension of the bearing block is constructed as a carrier eyelet with two roof-shaped inclined legs of which one leg is offset laterally relative to the other leg in a plane transverse to the longitudinal direction of the foundation in a location for formation of a suspension free space for the carrier arm; and
at least one introductory incline for carrier eyelet centering during stacking of several of said bearing blocks provided below said carrier eyelet on said foundation, said foundation of said bearing block having the interface carrier eyelets being constructed as an essentially rectangular-shaped profiled frame and the introductory incline being constructed as a stiffening reinforcement support of said profiled frame.

9. An apparatus according to claim 8 in which the carrier arms of said traverse suspendible in the carrier eyelets are arranged as transverse struts between two longitudinal carriers of said traverse extending parallel to said foundation of said carrier block.

10. An apparatus according to claim 9 in which said longitudinal carriers of said traverse having the carrier arms are constructed as a U-shaped cross section.

11. An apparatus according to claim 9 in which said longitudinal carriers of said traverse are constructed as squared tubing in cross section having said carrier arms passing transversely therethrough diagonally as to said corners.

12. An apparatus according to claim 9 in which said longitudinal carriers of said traverse are constructed as round tubing in cross section having said carrier arms passing diametrically thereof.

13. An apparatus according to claim 9 in which inclined guide surfaces are provided at the underside of said longitudinal carriers of said traverse for introduction between said carrier eyelets of said bearing block.

14. An apparatus according to claim 13, in which a carrier roller is journalled engaging in said carrier eyelet of said bearing block at end regions of said carrier arms projecting as to the longitudinal carrier of said traverse.

15. An apparatus for supporting and transporting heavy loads, especially metallic section rods, bars, pipes, tubes, and the like, with at least one U-shaped bearing block which has a foundation and two side parts on which respectively a suspension is provided in which a carrier arm of a traverse is suspendible, comprising:
the improvement therewith that the suspension of the bearing block is constructed as a carrier eyelet with two roof-shaped inclined legs of which one leg is offset laterally relative to the other leg in a plane transverse to the longitudinal direction of the foundation in a location for formation of a suspension free space for the carrier arm, the carrier arms of said transverse suspendible in the carrier eyelets being arranged as traverse struts between two longitudinal carriers of said traverse extending parallel to said foundation of said carrier block;
inclined guide surfaces provided at the underside of said longitudinal carriers of said traverse for introduction between said carrier eyelets of said bearing block; a carrier roller journaled engaging in said carrier eyelet of said bearing block at end regions of said carrier arms projecting as to the longitudinal carrier of said traverse; and a microswitch connected to an electrical line in said carrier roller of said carrier arm of said traverse for a busy-signal communication message transmitted when suspension is attained, said busy-signal communication message including at least one of a light- and acoustical-signal delivery therewith.

16. An apparatus according to claim 15, in which an outer contact ring is mounted resiliently in a radial direction on said carrier roller and said contact ring has an inner surface, as well as an actuating plunger of said microswitch that engages against said inner surface.

17. An apparatus according to claim 16 including at least one O-ring consisting of resilient rubbery material upon which said outer contact ring of said carrier roller is mounted at an end region of said carrier arm.

18. An apparatus according to claim 17 in which said microswitch in the contact ring of said carrier roller is arranged in a region between two resilient O-rings, and a closure cover provided with said contact ring on the outer face side thereof.

* * * * *